(12) United States Patent
Shimizu et al.

(10) Patent No.: US 7,843,896 B2
(45) Date of Patent: Nov. 30, 2010

(54) MULTICAST CONTROL TECHNIQUE USING MPLS

(75) Inventors: Takao Shimizu, Kawasaki (JP); Yuichi Hotta, Kawasaki (JP); Yoko Torii, Kawasaki (JP); Seiji Matsuoka, Kawasaki (JP); Yuichi Fujita, Kawasaki (JP); Masanobu Shimakura, Kawasaki (JP); Maki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1247 days.

(21) Appl. No.: 11/289,501

(22) Filed: Nov. 30, 2005

(65) Prior Publication Data

US 2006/0268934 A1 Nov. 30, 2006

(30) Foreign Application Priority Data

May 18, 2005 (JP) ............................. 2005-145899

(51) Int. Cl.
*H04L 12/28* (2006.01)
*H04J 3/24* (2006.01)

(52) U.S. Cl. ................. 370/351; 370/390; 370/392; 370/474

(58) Field of Classification Search ................. 370/351, 370/389, 390, 392, 395.5, 400, 431, 432, 370/464, 473, 474; 709/201, 231, 238, 239, 709/243
See application file for complete search history.

(56) References Cited

U.S. PATENT DOCUMENTS

| | | | |
|---|---|---|---|
| 6,567,851 B1 * | 5/2003 | Kobayashi | 709/228 |
| 6,728,777 B1 * | 4/2004 | Lee et al. | 709/238 |
| 6,735,190 B1 * | 5/2004 | Chuah et al. | 370/352 |
| 7,240,364 B1 * | 7/2007 | Branscomb et al. | 726/9 |
| 2004/0010617 A1 * | 1/2004 | Akahane et al. | 709/243 |
| 2004/0100983 A1 * | 5/2004 | Suzuki | 370/432 |
| 2005/0021802 A1 * | 1/2005 | Chen et al. | 709/231 |
| 2005/0169266 A1 * | 8/2005 | Aggarwal et al. | 370/389 |
| 2006/0159092 A1 * | 7/2006 | Boers et al. | 370/390 |
| 2007/0147372 A1 * | 6/2007 | Liu et al. | 370/390 |

FOREIGN PATENT DOCUMENTS

| | | |
|---|---|---|
| JP | 2004-32114 | 1/2004 |
| JP | 2004-172819 | 6/2004 |

* cited by examiner

*Primary Examiner*—Nittaya Juntima
(74) *Attorney, Agent, or Firm*—Fujitsu Patent Center

(57) ABSTRACT

In this invention, an idea of the reverse direction label switched path (RLP) in Multi-Protocol Label Switching (MPLS) is applied to the multicast transmission to improve the management transmission in the multicast transmission, and to easily carry out an additional connection and disconnection. Specifically, in the reverse direction symmetric routing Label switched Path (LP), a virtual label in addition to an input label and an output label is used for the reverse direction routing. However, in this invention, instead of the virtual label, a multicast address to which a client terminal, which is connected to a head of the path on the reverse direction routing, and corresponds to a leaf in the multicast tree, is connected, is registered, as a multicast index, in routers on the path. Then, when receiving a multicast packet including a label and a multicast address, an output label corresponding to the received label is identified, thereby a destination link is identified.

3 Claims, 19 Drawing Sheets

| LABEL | VIRTUAL LABEL | LABEL |
|---|---|---|
| L11 | L11r | Lm |
| L12 | L12r | |

| LINK | LABEL |
|---|---|
| $\ell$ 121 | L11 |
| $\ell$ 123 | L12 |
| $\ell$ 124 | Lm |
| ⋮ | ⋮ |
| | |

| LINK(Lid) | LABEL(La) | | |
|---|---|---|---|
| ℓ 1015 | A | B | C |
| ⋮ | ⋮ | ⋮ | ⋮ |
| ℓ 5001 | X | Y | Z |

FIG.7

| LINK (Lid) | Bs | RTid | Pri-ρ | |
|---|---|---|---|---|
| | | | 0 | 1 |
| ℓ 1015 | 100 | RT10 | 20% | 15% |
| | | RT15 | 30% | 20% |
| ⋮ | ⋮ | ⋮ | ⋮ | ⋮ |
| ℓ 1015 | 100 | RT10 | 30% | 20% |
| | | RT15 | 20% | 15% |

FIG.8

| SOURCE ADDRESS | CH | MCA |
|---|---|---|
| So | 1 | Si |
| So | 2 | Sj |

FIG.14

| SNo | SNd | LP# | FAILURE || Lr | Bs | Bs BN | Cal | Pri | BdU | BdU BN | BdD | BdD BN | LABEL DATA ||||||||
|---|---|---|---|---|---|---|---|---|---|---|---|---|---|---|---|---|---|---|---|---|
| | | | U | D | | | | | | | | | | La | ρU | ρD | La | ρU | ρD |
| 10 | 20 | 1 | — | — | 10.1 | 100 | (La) | M/D | 0 | 60 | (La) | 40 | (La) | A | 20% | 30% | X | 30% | 20% |
| | | | | | | | | | 1 | 70 | (La) | 60 | (La) | | 15% | 20% | | 20% | 15% |
| | | 2 | — | — | 10.2 | 80 | (La) | M/D | 0 | 30 | (La) | 50 | (La) | B | 20% | 25% | Y | 25% | 20% |
| | | | | | | | | | 1 | 60 | (La) | 60 | (La) | | 15% | 20% | | 20% | 15% |
| | | 3 | — | — | 10.3 | 60 | (La) | M/D | 0 | 40 | (La) | 30 | (La) | C | 20% | 30% | Z | 30% | 20% |
| | | | | | | | | | 1 | 50 | (La) | 40 | (La) | | 15% | 25% | | 20% | 15% |

FIG.9

| SNo | SNd | ... | Lr | ... | LABEL DATA ||||||
|---|---|---|---|---|---|---|---|---|---|---|
| | | | | | L | ... | L | ... | L | ... |
| 10-19 | So | ... | La | | La | ... | Lb | ... | Lc | ... |
| 20-29 | So | ... | La1 | ... | La1 | ... | Lb1 | ... | Lc | ... |
| 30-39 | So | ... | La2 | ... | La2 | ... | Lb2 | ... | Lc1 | ... |

FIG.11

| LP | CL | REQUESTING SOURCE | L | Mi | L | Mi | L | Mi | Ls |
|---|---|---|---|---|---|---|---|---|---|
| L10 | 10 | So.Si | La | Si,Sj | Lb | Si,Sj | Lc | Si,Sj | So |
| | 11 | So.Sj | | | | | | | |
| | 12 | So.Sj | | | | | | | |
| L20 | 20 | So.Si | La1 | Si | Lb1 | Si | | | |
| | 21 | So.Si | | | | | | | |
| | 22 | So.Si | | | | | | | |
| | 23 | | | | | | | | |
| L30 | 30 | So.Sj | La2 | Sj | Lb2 | Sj | Lc1 | Sj | |
| | 31 | So.Sj | | | | | | | |
| | 32 | So.Sj | | | | | | | |

FIG.18

| LABEL | VIRTUAL LABEL | LABEL |
|---|---|---|
| 10 | | La |
| 11 | | La |
| 12 | | La |

FIG.12A

| LABEL | VIRTUAL LABEL | LABEL |
|---|---|---|
| La | | Lb |

FIG.12B

| LABEL | VIRTUAL LABEL | LABEL |
|---|---|---|
| Lb | La | Lc |
| Lb1 | La1 | Lc |

FIG.12C

| LABEL | VIRTUAL LABEL | LABEL |
|---|---|---|
| Lc | La/La1 | So |
| Lc1 | La2 | So |

FIG.12D

| LABEL | VIRTUAL LABEL | LABEL |
|---|---|---|
| 20 | | La1 |
| 21 | | La1 |
| 22 | | La1 |
| 23 | | La1 |

FIG.12E

| LABEL | VIRTUAL LABEL | LABEL |
|---|---|---|
| La1 | | Lb1 |

FIG.12F

| LABEL | VIRTUAL LABEL | LABEL |
|---|---|---|
| 30 | | La2 |
| 31 | | La2 |
| 32 | | La2 |

FIG.12G

| LABEL | VIRTUAL LABEL | LABEL |
|---|---|---|
| La2 | | Lb2 |

FIG.12H

| LABEL | VIRTUAL LABEL | LABEL |
|---|---|---|
| Lb2 | | Lc1 |

FIG.12I

| LP | CL | REQUESTING SOURCE | L | Mi | L | Mi | L | Mi | Ls |
|---|---|---|---|---|---|---|---|---|---|
| L10 | 10 | | La | | Lb | | Lc | | So |
| | 11 | | | | | | | | |
| | 12 | | | | | | | | |
| L20 | 20 | | La1 | | Lb1 | | Lc | | So |
| | 21 | | | | | | | | |
| | 22 | | | | | | | | |
| | 23 | | | | | | | | |
| L30 | 30 | | La2 | | Lb2 | | Lc1 | | So |
| | 31 | | | | | | | | |
| | 32 | | | | | | | | |

FIG.15

| LP | CL | REQUESTING SOURCE | L | Mi | L | Mi | L | Mi | Ls |
|---|---|---|---|---|---|---|---|---|---|
| L10 | 10 | | La | | Lb | | Lc | | So |
| | 20 | | | | | | | | |
| | 30 | | | | | | | | |
| L20 | 20 | | La1 | | Lb1 | | | | |
| | 21 | | | | | | | | |
| | 22 | | | | | | | | |
| | 23 | | | | | | | | |
| L30 | 30 | | La2 | | Lb2 | | Lc1 | | |
| | 31 | | | | | | | | |
| | 32 | | | | | | | | |

FIG.16

| LABEL | Mi | LABEL |
|---|---|---|
| 10 | | La |
| 11 | | La |
| 12 | | La |

FIG.17A

| LABEL | Mi | LABEL |
|---|---|---|
| La | | Lb |

FIG.17B

| LABEL | Mi | LABEL |
|---|---|---|
| Lb | | Lc |
| Lb1 | | Lc |

FIG.17C

| LABEL | Mi | LABEL |
|---|---|---|
| Lc | | Ls |
| Lc1 | | Ls |

FIG.17D

| LABEL | Mi | LABEL |
|---|---|---|
| 20 | | La1 |
| 21 | | La1 |
| 22 | | La1 |
| 23 | | La1 |

FIG.17E

| LABEL | Mi | LABEL |
|---|---|---|
| La1 | | Lb1 |

FIG.17F

| LABEL | Mi | LABEL |
|---|---|---|
| 30 | | La2 |
| 31 | | La2 |
| 32 | | La2 |

FIG.17G

| LABEL | Mi | LABEL |
|---|---|---|
| La2 | | Lb2 |

FIG.17H

| LABEL | Mi | LABEL |
|---|---|---|
| Lb2 | | Lc1 |

| LABEL | Mi | LABEL |
|---|---|---|
| 10 | Si | La |
| 11 | Sj | La |
| 12 | Sj | La |

FIG.19B

| LABEL | Mi | LABEL |
|---|---|---|
| La | Si,Sj | Lb |

FIG.19C

| LABEL | Mi | LABEL |
|---|---|---|
| Lb | Si,Sj | Lc |
| Lb1 | Si | Lc |

FIG.19D

| LABEL | Mi | LABEL |
|---|---|---|
| Lc | Si,Sj | Ls |
| Lc1 | Sj | Ls |

FIG.19E

| LABEL | Mi | LABEL |
|---|---|---|
| 20 | Si | La1 |
| 21 | Si | La1 |
| 22 | Si | La1 |
| 23 |  | La1 |

FIG.19F

| LABEL | Mi | LABEL |
|---|---|---|
| La1 | Si | Lb1 |

FIG.19G

| LABEL | Mi | LABEL |
|---|---|---|
| 30 | Sj | La2 |
| 31 | Sj | La2 |
| 32 | Sj | La2 |

FIG.19H

| LABEL | Mi | LABEL |
|---|---|---|
| La2 | Sj | Lb2 |

FIG.19I

| LABEL | Mi | LABEL |
|---|---|---|
| Lb2 | Sj | Lc1 |

FIG.22A

| LABEL | Mi | LABEL |
|---|---|---|
| 20 | Si | La1 |
| 21 | Si | La1 |
| 22 | Si | La1 |
| 23 | Sj | La1 |

FIG.22B

| LABEL | Mi | LABEL |
|---|---|---|
| La1 | Si,Sj | Lb1 |

FIG.22C

| LABEL | Mi | LABEL |
|---|---|---|
| Lb | Si,Sj | Lc |
| Lb1 | Si,Sj | Lc |

FIG.23

| LP | CL | REQUESTING SOURCE | L | Mi | L | Mi | L | Mi | Ls |
|---|---|---|---|---|---|---|---|---|---|
| L10 | 10 | So.Si | La | Si,Sj | Lb | Si,Sj | Lc | Si,Sj | So |
| L10 | 20 | So.Sj | La | Si,Sj | Lb | Si,Sj | Lc | Si,Sj | So |
| L10 | 30 | So.Sj | La | Si,Sj | Lb | Si,Sj | Lc | Si,Sj | So |
| L20 | 20 | So.Si | La1 | Si,Sj | Lb1 | Si,Sj | | | So |
| L20 | 21 | So.Si | La1 | Si,Sj | Lb1 | Si,Sj | | | So |
| L20 | 22 | So.Si | La1 | Si,Sj | Lb1 | Si,Sj | | | So |
| L20 | 23 | So.Sj | La1 | Si,Sj | Lb1 | Si,Sj | | | So |
| L30 | 30 | So.Sj | La2 | Sj | Lb2 | Sj | Lc1 | Sj | |
| L30 | 31 | So.Sj | La2 | Sj | Lb2 | Sj | Lc1 | Sj | |
| L30 | 32 | So.Sj | La2 | Sj | Lb2 | Sj | Lc1 | Sj | |

| LP | CL | Mi | | L | Mi | | L | Mi | | L | Mio | | Ls | Mio |
| --- | --- | --- | --- | --- | --- | --- | --- | --- | --- | --- | --- | --- | --- | --- |
| | | Si | Si | | Si | Si | | Si | Si | | Si | Si | | Sj |
| L10 | 10 | △ | △ | La | △ | △ | Lb | △ | △ | Lc | △ | △ | So | Si |
| | 11 | △ | △ | | △ | △ | | △ | △ | | △ | △ | | |
| | 12 | △ | — | | △ | △ | | △ | △ | | △ | △ | | |
| L20 | 20 | △ | △ | La1 | △ | △ | Lb1 | △ | △ | | | | | |
| | 21 | △ | △ | | △ | △ | | △ | △ | | | | | |
| | 22 | △ | △ | | △ | △ | | △ | △ | | | | | |
| | 23 | △ | △ | | △ | △ | | △ | △ | | | | | |
| L30 | 30 | △ | △ | La2 | △ | △ | Lb2 | △ | △ | Lc1 | △ | △ | | |
| | 31 | △ | △ | | △ | △ | | △ | △ | | | | | |
| | 32 | △ | △ | | △ | △ | | △ | △ | | | | | |

| L | Mi | | L |
|---|---|---|---|
| | Si | Sj | |
| La | △ | △ | Lb |

FIG.28B

| CL | Mi | | L |
|---|---|---|---|
| | Si | Sj | |
| 10 | △ | △ | |
| 20 | △ | △ | La |
| 30 | — | △ | |

FIG.28C

| L | Mi | | L |
|---|---|---|---|
| | Si | Sj | |
| Lb | △ | △ | Lc |
| Lb1 | △ | △ | |

FIG.28D

| L | Mi | | L |
|---|---|---|---|
| | Si | Sj | |
| La1 | △ | △ | Lb1 |

FIG.28E

| L | Mi | | L |
|---|---|---|---|
| | Si | Sj | |
| Lc | △ | △ | So |
| Lc1 | △ | △ | |

FIG.28F

| CL | Mi | | L |
|---|---|---|---|
| | Si | Sj | |
| 20 | △ | △ | |
| 21 | △ | △ | La1 |
| 22 | △ | △ | |
| 23 | △ | △ | |

FIG.28G

| L | Mi | | L |
|---|---|---|---|
| | Si | Sj | |
| Lb2 | △ | △ | Lc1 |

FIG.28H

| L | Mi | | L |
|---|---|---|---|
| | Si | Sj | |
| La2 | △ | △ | Lb2 |

FIG.28I

| CL | Mi | | L |
|---|---|---|---|
| | Si | Sj | |
| 30 | △ | △ | |
| 31 | △ | △ | La2 |
| 32 | △ | △ | |

MULTICAST CONTROL TECHNIQUE USING MPLS

TECHNICAL FIELD OF THE INVENTION

The present invention relates to a multicast transmission control technique.

BACKGROUND OF THE INVENTION

The routing in a conventional multicast is realized by a dedicated protocol for the multicast. In this dedicated protocol, when a connection request is received from a client terminal, it is necessary to set up a network, which is managed in a tree structure, for each additional connection. Accordingly, there is a problem that the operational efficiency is low. In addition, in this case, there are problems that, precisely, it is difficult to generate a distribution tree, and that it is also difficult to carry out distribution for each source type. Further, it is difficult to provide a multicast service, and thus to conveniently use the multicast service on-demand.

Incidentally, for example, JP-A-2004-172819 discloses a technique capable of carrying out simple transmission, transmission by an explicit path, and transmission whose bandwidth is ensured, in multicast data transmission. More specifically, while a transmission route is formed by a multicast protocol, a transmission route formation manager operates as follows. That is, a label is assigned to a relay device and is included in a participation message to form LSP. Next, a required bandwidth is ensured in a policy table, and is then entered into the participation message. Then, the explicit addresses of the relay devices on the transmission route are designated in the policy table, and the explicit transmission route is formed by the addresses.

In addition, JP-A-2004-32114 discloses a technique in which, under a large-scale MPLS network environment, multicast path settings for a source activation and a leaf activation are possible, two setting mechanisms can be mutually operated without inconsistency there between, QoS can be ensured, and the addition, removal or correction of a necessary partial tree can be carried out, without resetting the entire multicast LSP which has already been set. Specifically, in addition to a path setting function by the source activation, the technique includes a participation function into the multicast tree by the leaf activation, a function for designating a path setting node by the leaf activation, a function for selecting a branch point by the leaf activation, a function for grafting and pruning the tree by the source activation, a mutual operation function of the source and leaf activations by specifying a path by a multicast session identifier, a function for allocating plural traffics to one LSP, a function for setting and releasing a path between multipoints, a function for explicitly specifying a transferring path, and other functions.

As described above, various multicast transmission techniques have been disclosed. However, a technique using a Reverse Label switched Path (RLP) in a Multi-Protocol Label Switching (MPLS) network has not been disclosed, yet. In addition, because RSVP (Resource reSerVation Protocol) or a protocol equivalent thereto is used, the processing load increases. Furthermore, because the configuration of the multicast tree should be updated for each occurrence of the participation, the processing load increases.

SUMMARY OF THE INVENTION

Therefore, an object of the invention is to provide a technique for improving the management efficiency of the multicast transmission in an MPLS network.

Further, another object of the invention is to provide a technique enabling to easily start additional transmission in response to a new connection request from a client terminal in an MPLS network.

Furthermore, still another object of the invention is to provide a technique enabling to easily stop transmission in response to a new disconnection request from a client terminal in an MPLS network.

An information processing method according to a first aspect of the invention is an information processing method, which is executed by a management server that manages a path in a specific network, including: when a registration request including data concerning a source address and a source channel is received from a multicast source server, allocating a multicast address corresponding to the source channel to discriminate passing multicast data, and storing the multicast address into a multicast data storage; reading out, from a path data storage that stores data concerning labels of links constituting paths in the specific network, data concerning labels of links constituting a multicast path from the source address included in the registration request to an edge router connected to a computer, which receives multicast data, generating a data structure capable of registering the multicast address in association with each label, and storing the data structure into the multicast data storage.

This data structure makes it possible to improve the efficiency of management and to flexibly cope with additional connection, disconnection or the like.

An information processing method according to a second aspect of the invention includes: when a multicast connection request relating to a specific multicast address is received from an edge router connected to a client terminal, identifying a path used for data transmission to the client terminal by referring to a multicast data storage, which stores data concerning labels of links constituting multicast paths from a source address of a multicast source server to an edge router connected to a client terminal that is capable of receiving multicast data; identifying, in the multicast data storage, a label that is not associated with the specific multicast address relating to the multicast connection request, among the labels of the links constituting the identified path, and registering the specific multicast address in association with the identified label in the multicast data storage; and carrying out a setting for a router associated with the identified label to register the specific multicast address in association with the identified label.

Even in such a case where an additional connection is carried out, it becomes possible to easily grasp in what label corresponding to a link) of what path new transmission should start, and also to easily carry out a setting for the associated router.

An information processing method according to a third aspect of the invention includes: when a multicast disconnection request relating to a specific multicast address is received from an edge router connected to a specific client terminal that receives multicast data of the specific multicast address, identifying a path being used for data transmission to the specific client terminal, by referring to a multicast data storage, which stores labels of links constituting multicast paths from a source address of a multicast source server to an edge router connected to a client terminal that receives the multicast data, multicast addresses associated with the labels, and multicast addresses relating to the client terminals receiving the multicast data; determining whether or not the multicast address relating to the multicast disconnection request is registered in the multicast data storage in association with any of the client terminals associated with a label to be processed in order from a lower label in the identified path, and when it is determined that the multicast address relating to the multicast disconnection request is not registered in association with any of the client terminals associated with the label to be processed, deleting, in the multicast data storage, the multicast address, which is registered in association with the label to be processed and relates to the multicast disconnection request, and causing to execute the determining for an upper label in the identified path; when it is determined that the multicast address relating to the multicast disconnection request is registered in association with any of the client terminals associated with the label to be processed, deleting, in the multicast data storage, the multicast address, which is registered in association with the label to be processed and relates to the multicast disconnection request; and transmitting a deletion instruction including the multicast address relating to the multicast disconnection request and a label for which the corresponding multicast address was deleted to a router associated with the label for which the corresponding multicast address was deleted.

Thus, also at the disconnection, it becomes possible to easily determine in what label of what path the data transmission is not required, and to easily carry out a setting for the associated router.

A router according to a fourth aspect of the invention, which carries out routing according to an instruction of a management server for managing a path between arbitrary nodes in a specific network, includes: a data storage storing a pair of labels for an input link and an output link which are directly connected to the router, among links constituting paths passing through the router, and correspondence between labels and links; and a routing unit that identifies an output link and an output label corresponding to an input label included in a received packet, by referring to the data storage, and carries out routing of the received packet based on the identified output link and output label. In addition, the data storage stores a multicast address in addition to the input label and the output label, which relate to an uplink. When receiving a downlink packet including the output label and the multicast address, the routing unit searches data stored in the data storage by using the multicast address and the output label, which are included in the downlink packet, to identify an output link of the downlink packet.

Also in RLP, input and output labels in the forward direction are stored in association with a virtual label indicating a branch destination for the reverse routing, and the link of the input label is identified by a combination of the output label and the virtual label at the time of the actual reverse routing. The invention makes it possible to carry out the multicast in each router by employing this mechanism.

Moreover, the router according to the fourth aspect of the invention may further include a unit that registers a multicast address included in a connection instruction in association with the input label, by referring to the data storage, when receiving the connection instruction including the input label and the multicast address from a management server. In this way, it is possible to carry out an additional connection of the multicast by a simple processing.

It is possible to create a program for causing a computer to execute the information processing method according to this invention, and this program is stored in a storage medium or a storage device such as a flexible disk, a CD-ROM, an optical magnetic disk, a semiconductor memory, and a hard disk. Further, the program may be distributed as a digital signal through a network. Incidentally, intermediate processing results are temporarily stored in a storage device such as a main memory.

BRIEF DESCRIPTION OF THE DRAWINGS

FIG. 7 is a diagram illustrating an example of a link table in an LP management server.

FIG. 8 is a diagram illustrating an example of a link data table;

FIG. 9 is a diagram illustrating an example of an LP table;

FIG. 11 is a diagram illustrating an example of the LP table in case of FIG. 10;

FIGS. 12A to 12I are diagrams illustrating label maps in routers shown in FIG. 10.

FIG. 14 is a diagram illustrating an example of an MCA table;

FIG. 15 is a diagram illustrating an example of the original form of an RLP table;

FIG. 16 is a diagram illustrating an example of an RLP table after an aggregation processing;

FIGS. 17A to 17I are diagrams illustrating data structures for the multicast, which are stored in the respective routers shown in FIG. 10;

FIG. 18 is a diagram illustrating an example of the state of the RLP table;

FIGS. 19A to 19I are diagrams illustrating data structures for the multicast, which are stored in the routers in association with FIG. 18;

FIG. 22A is a diagram illustrating the state of the data structure of FIG. 19E after change;

FIG. 22B is a diagram illustrating the state of the data structure of FIG. 19F after change;

FIG. 22C is a diagram illustrating the state of the data structure of FIG. 19C after change;

FIG. 23 is a diagram illustrating an example of the state of the RLP table after change;

FIG. 27 is a diagram illustrating an example of the RLP table (state management) after an aggregation processing; and FIGS. 28A to 28I are diagrams illustrating the data structures for the multicast, each stored in the router in case of FIG. 27.

DETAILED DESCRIPTION OF THE PREFERRED EMBODIMENTS

Figure 1:
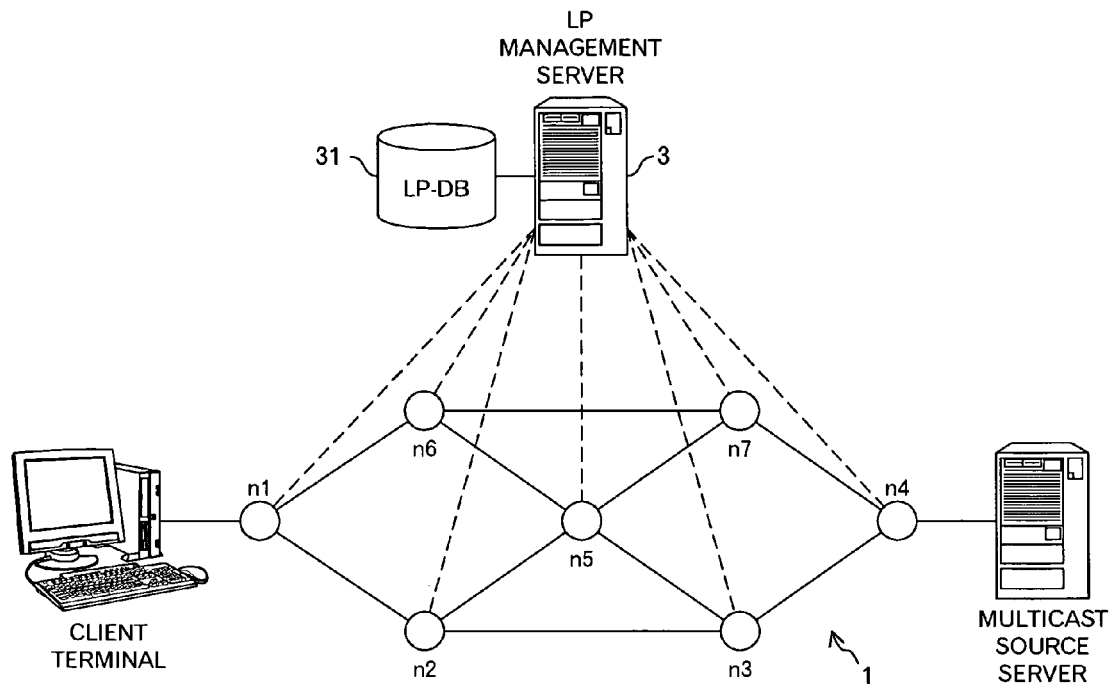
FIG. 1 is a diagram schematically illustrating a network according to an embodiment of the invention.

FIG. 1 is a conceptual diagram of a network according to an embodiment of the invention. In this embodiment, an LP management server 3 is connected to a network 1 including routers, such as nodes n1 to n7. The characters 'LP' represent an abbreviated word of a Label switched Path in MPLS (Multi Protocol Label Switching), and the LP managing server 3 functions to determine the optimum path (LP) between arbitrary nodes in the network 1. That is, routing in the network 1 is intensively controlled by the LP management server 3, and the nodes are directly and indirectly controlled by the LP management server 3, as represented by dotted lines in FIG. 1. For such a processing, the LP management server 3 manages an LP-DB 31 storing data relating to LPs. The data stored in the LP-DB 31 will be described later in detail.

Further, for example, the node n4 is a server-side edge router connected to a multicast source server, and the node n1 is a client-terminal-side edge router connected to one or more client terminals. Thus, the multicast is carried out from the multicast source server to one of or plural client terminals over the network 1 at the transmission of video data (moving image) and data transmission such as teleconference.

Figure 2A:
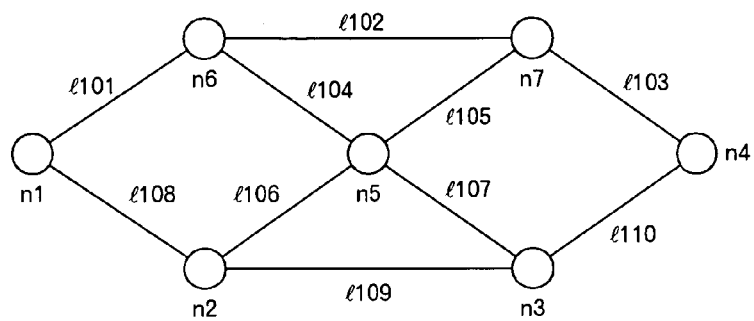
FIGS. 2A to 2C are conceptual diagrams illustrating the network.

Here, the basic concept of routing in a domain will be described. As shown in FIG. 2A, a link 1101 is provided between a node n1 and a node n6, and a link 1102 is provided between the node n6 and a node n7. A link 1103 is provided between the node n7 and a node n4, and a link 1104 is provided between the node n6 and a node n5. A link 1105 is provided between the node n5 and the node n7, and a link 1106 is provided between the node n5 and a node n2. A link 1107 is provided between the node n5 and a node n3, and a link 1108 is provided between the node n2 and the node n1. A link 1109 is provided between the node n2 and the node n3, and a link 1110 is provided between the node n3 and the node n4.

Figure 2B:
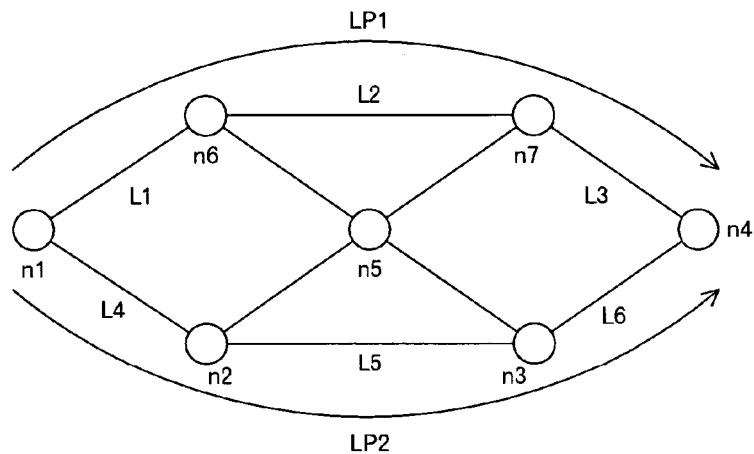

In such a network, as shown in FIG. 2B, LP1 and LP2 exist as paths from the node n1 to the node n4. LP1 is composed of the link 1101, the link 1102, and the link 1103. In the case of the path LP1, a label L1 is assigned to the link 1101, a label L2 is assigned to the link 1102, and a label L3 is assigned to the link 1103. In addition, LP2 is composed of the link 1108, the link 1109, and the link 1110. In the case of the path LP2, a label L4 is assigned to the link 1108, a label L5 is assigned to the link 1109, and a label L6 is assigned to the link 1110.

Figure 2C:
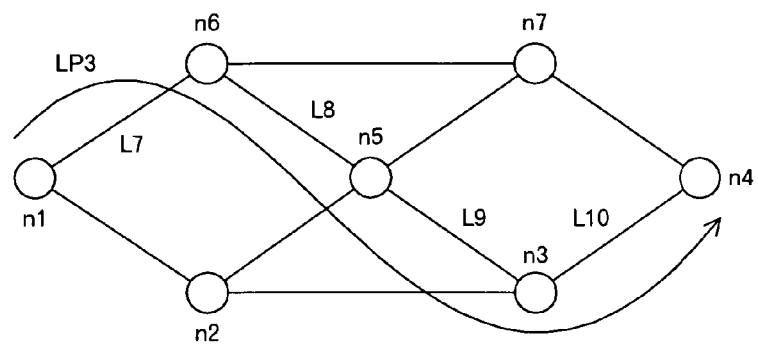

Furthermore, as shown in FIG. 2C, LP3 exists as another path from the node n1 to the node n4. LP3 is composed of the link 1101, the link 1104, the link 1107, and the link 1110. In the case of the path LP3, a label L7 is assigned to the link 1101, a label L8 is assigned to the link 1104, a label L9 is assigned to the link 1107, and a label L10 is assigned to the link 1110.

As such, the link 1101 is commonly used for LP1 and LP3, but different labels are assigned to the same link l101 in such a manner that the label L1 is assigned thereto in LP1, and the label L7 is assigned thereto in LP3. That is, basically, different labels are assigned to the same link according to LPs even in a case where the same link is used. In other words, a label is uniquely assigned in all LPs. When a label is specified, LP is also specified. Thus, a link relating to a label next to the specified label can be specified. For example, when the label L8 is designated, the link l104 relating to the label L8 is specified, and the next label L9 is also specified, and then the link l107 relating to the label L9 is also specified. Therefore, forward routing is possible in each node. Incidentally, as for the priority class, LP is not prepared for every priority class, but an LP method in which the priority class is set as a sub-set of the LP is used as a premise.

In FIG. 2A, LP from the node n1 to the node n4 is discussed, but the same labels as those used for the forward LP are also used for reverse LP (RLP: Reverse Label Switched Path) in this embodiment. That is, the reverse LP symmetric with respect to the forward LP is used. In this way, it is possible to commonly use routing information for downlink and uplink, and thus to reduce the amount of data to be managed. More specifically, for example, in the reverse routing, when the label L3 is specified, the label L2 is specified as the next label. That is, it is also possible to carry out reverse routing in each node.

Figure 3A:
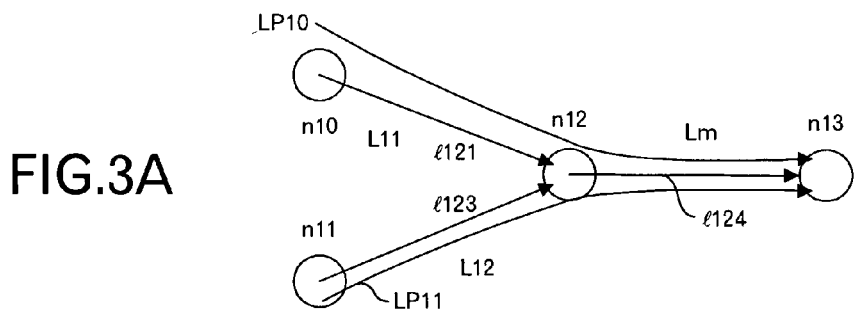
FIGS. 3A and 3B are diagrams to explain virtual labels.
Figure 3B:
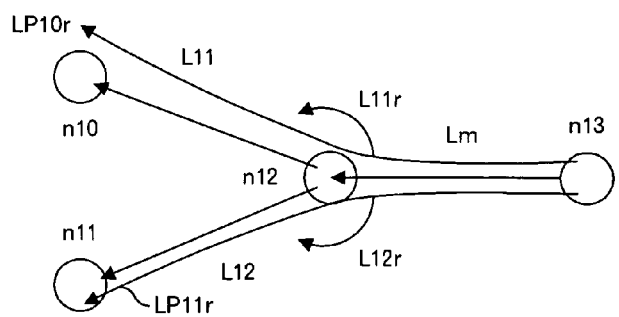

However, according to this configuration, as the number of LPs and the number of nodes become larger, the number of labels ((the number of LPs)×(the number of nodes)) becomes larger. Therefore, the amount of data to be managed is increased. Then, in this embodiment, a label merging is adopted. A simple example is shown in FIGS. 3A and 3B. As shown in FIG. 3A, in a network including nodes n10, n11, n12, and n13, a path from the node n10 to the node n12 is denoted as LP10, and a path from the node n11 to the node n12 is denoted as LP11. In addition, a link from the node n10 to the node n12 is denoted as l121, and a link from the node n11 to the node n12 is denoted as l123. A link from the node n12 to the node n13 is denoted as l124. In such a case, the same link 1124 is used for the LP10 and LP11, but it is necessary to register different labels for every LPs according to the explanation for FIGS. 2A to 2C. However, as described above, in order to reduce the amount of data to be managed, only one label Lm is assigned to the link l124 by merging the labels for the link l124. That is, LP10 is composed of the label L11 and the label Lm, and the LP11 is composed of the label L12 and the label Lm. In the node n12, when the label L11 is specified, the label Lm can be specified as the next label for LP10. Similarly, in the node n12, when the label L12 is specified, the label Lm can be specified as the next label for the LP11. described above, in order to reduce the amount of data to be managed, only one label Lm is assigned to the link 1124 by merging the labels for the link 1124. That is, LP10 is composed of the label L11 and the label Lm, and the LP11 is composed of the label L12 and the label Lm. In the node n12, when the label L11 is specified, the label Lm can be specified as the next label for LP10. Similarly, in the node n12, when the label L12 is specified, the label Lm can be specified as the next label for the LP11.

As shown in FIG. 3B, in the case of reverse direction, that is, LP10r from the node n13 to the node n10 and LP11r from the node n13 to the node n11, the reverse direction is not automatically specified unlike the explanation for FIGS. 2A to 2C. That is, even when the label Lm is specified, it is impossible to specify the LP10r or LP11r. As a result, because the next label cannot be specified, it is impossible to carry out the routing. Therefore, in this embodiment, in order to makes it possible to carry out the routing even when the label merging is carried out, a virtual label is introduced to carry out branching in the branch node n12.

The virtual label functions to specify LP, for example, a branch destination label. In an example of FIG. 3B, at the node n12, branch to the label L11 is carried out according to the virtual label L11r. That is, when the LP10r is used, the node n13 transmits a packet, which specifies both the label Lm and the virtual label L11r. Meanwhile, when the LP11r is used, similarly, the node n13 transmits a packet, which specifies both the label Lm and a virtual label L12r. The following can be used as the virtual label: (a) a unique head label name of the forward LP in a domain; (b) a unique label name in a domain corresponding to the number of path multiplicities of a source network address; (c) a unique label name corresponding to the number of path multiplicities and a source prefix or the like.

Incidentally, because the routing within the domain is discussed in FIGS. 3A and 3B, an additional mechanism, which will be described later, is needed to handle a path between domains.

Figures 4, 5, 6:
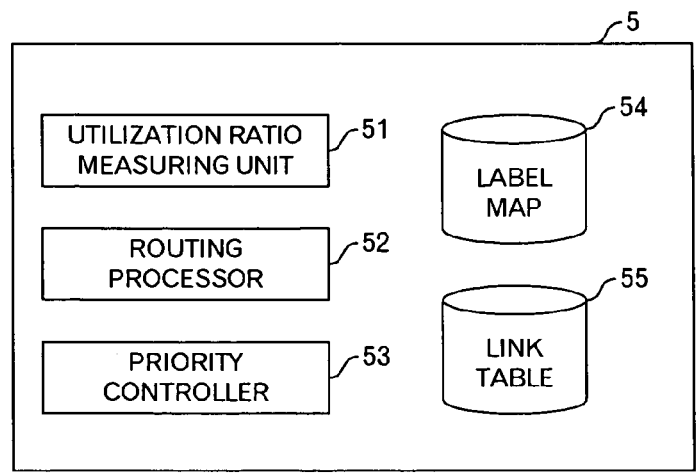
FIG. 4 is a functional block diagram of a router.
FIG. 5 is a diagram illustrating an example of a label map.
FIG. 6 is a diagram illustrating an example of a link table in a router.

Next, a configuration for realizing the basic mechanism shown in FIGS. 2A to 2C and FIGS. 3A and 3B will be described below. FIG. 4 shows a functional block diagram illustrating a router disposed at a node. A router 5 includes a label map 54, a link table 55, a priority controller 53, which conventionally exists, to carry out a processing for priority control such as 8-class priority control, a utilization ratio measuring unit 51 for measuring the utilization ratio of a link for each priority class, and a routing processor 52, which is operatively associated with the priority controller 53, to carry out a packet routing, referring to the routing map 54 and the link table 55.

The label map 54 of the node n12 in FIG. 3A includes data shown in FIG. 5, for example. That is, a table shown in FIG. 5 includes, from the left side thereof, a first label column, a virtual label column, and a second label column, and each record corresponds to one LP. In FIG. 5, data for LP10 is registered in the first record, and because the node n12 is a branch node, the virtual label L11r and the label Lm are registered therein in association with the label L11. Therefore, when a packet to which the label L11 is attached is received from the node n10, it is determined based on the label map 54 that the packet should be transferred to the label Lm. In contrast, when a packet to which the label Lm and the virtual label L12r are attached is received, it is determined based on the label map 54 that the packet should be transferred to the label L12.

Meanwhile, the link table 55 of the node n12 in FIG. 3A includes data shown in FIG. 6, for example. That is, the table shown in FIG. 6 has a link column and a label column, and links and labels are associated with each other therein. As such, when a label can be specified, a link can also be specified. As a result, a port connected to a cable constituting the link in the router 5 is also specified. Therefore, it is possible to carry out the packet routing.

The utilization ratio-measuring unit 51 of the router 5 regularly measures the utilization ratios of the links and notifies them to the LP management server. However, when the utilization ratio varies within a predetermined range, the notice may be omitted. Incidentally, in a case where a bottleneck link is included in the links connected to the router 5, the LP management server transmits an intensive monitoring instruction to the router 5. Therefore, when receiving the intensive monitoring instruction, the utilization ratio-measuring unit 51 shortens a monitoring period for the bottleneck link. In a case where, if the utilization ratio varies beyond a predetermined range, its notice is transmitted to the LP management server, the utilization ratio measuring unit 51 carries out a processing for narrowing the predetermined range, or the like.

Next, examples of data stored in the LP-DB to realize the basic mechanism shown in FIGS. 2A to 2C and FIGS. 3A and 3B are shown in FIGS. 7 to 9. FIG. 7 shows an example of a link table. Similar to FIG. 6, the table shown in FIG. 7 includes a column of a link Lid and a column of a label La, and a relationship between a link and a label assigned to the link is registered in the table. Data of links for the entire network is registered in the LP-DB. In a case where the configuration of the network is changed, data in the table is also changed.

FIG. 8 shows an example of a link data table. The table shown in FIG. 8 includes a column of a link Lid, a column for a static bandwidth Bs of a link, a column for ID (RTid) of routers connected to both ends of the link, and a column of the link utilization ratio Pri-$\rho$ for each priority. For the simplicity of explanation, it is assumed that priorities of "0" and "1" exist. The utilization ratio measured by the utilization ratio-measuring unit 51 in the router 5 is transmitted to the corresponding LP management server, and is then registered in this table.

FIG. 9 shows an example of an LP table. The table shown in FIG. 9 includes a column for a source network address set number (SNo) that indicates a set of network addresses (when one network address exists, the network address is indicated, and when two or more network addresses exist, a representative network address is indicated) under the control of a source edge router, a column for a destination network address set number (SNd) that indicates a set of network addresses under the control of a destination edge router, a column for an order of the static transmission bandwidth Bs of LP that connects SNo and SNd, a column to indicate the state of a failure (uplink U/downlink D), a column for a virtual label in the reverse LP (RLP) (for example, SNo is used. SNo corresponds to a destination side, because of the reverse direction), a column for the LP static transmission bandwidth Bs calculated from the band capacities of respective links constituting the LP, a column for a label BsBN corresponding to a bottleneck link causing the static transmission bandwidth, a column of a transmission bandwidth calculating method Cal to register a case (M) in which a packet size is random or a case (D) in which a packet size is uniform, a column of a priority (Pri) to distinguish a best effort (O) from a highest priority (1), a column of an uplink-side dynamic transmission bandwidth BdU, a column of a label BdUBN corresponding to the bottleneck link causing the uplink-side dynamic transmission bandwidth, a column of a downlink-side dynamic transmission bandwidth BdD, a column of a label BdDBN corresponding to the bottleneck link causing the downlink-side dynamic transmission bandwidth, and a label data column. The label data column includes labels La constituting the LP, uplink-side utilization ratios $\rho U$ of links corresponding to the labels, and downlink-side utilization ratios $\rho D$ of the links corresponding to the labels. Incidentally, although an example is described in which the priority has only two stages, in general, it can have N stages (N is a positive integer).

When the multicast is not carried out, data communication is effectively carried out in the network 1 by maintaining and updating the aforementioned data. On the other hand, when the multicast is carried out, data is transmitted from the multicast source server to the client terminal. Therefore, for example, RLP in the reverse direction, not LP in the forward direction, is mainly used, contrary to the case in which a web browser of the client terminal acquires, for example, an HTML (hyper text markup language) file from a web server by HTTP (hyper text transfer protocol). In this embodiment, the multicast is carried out by applying this mechanism of RLP.

Figure 10:
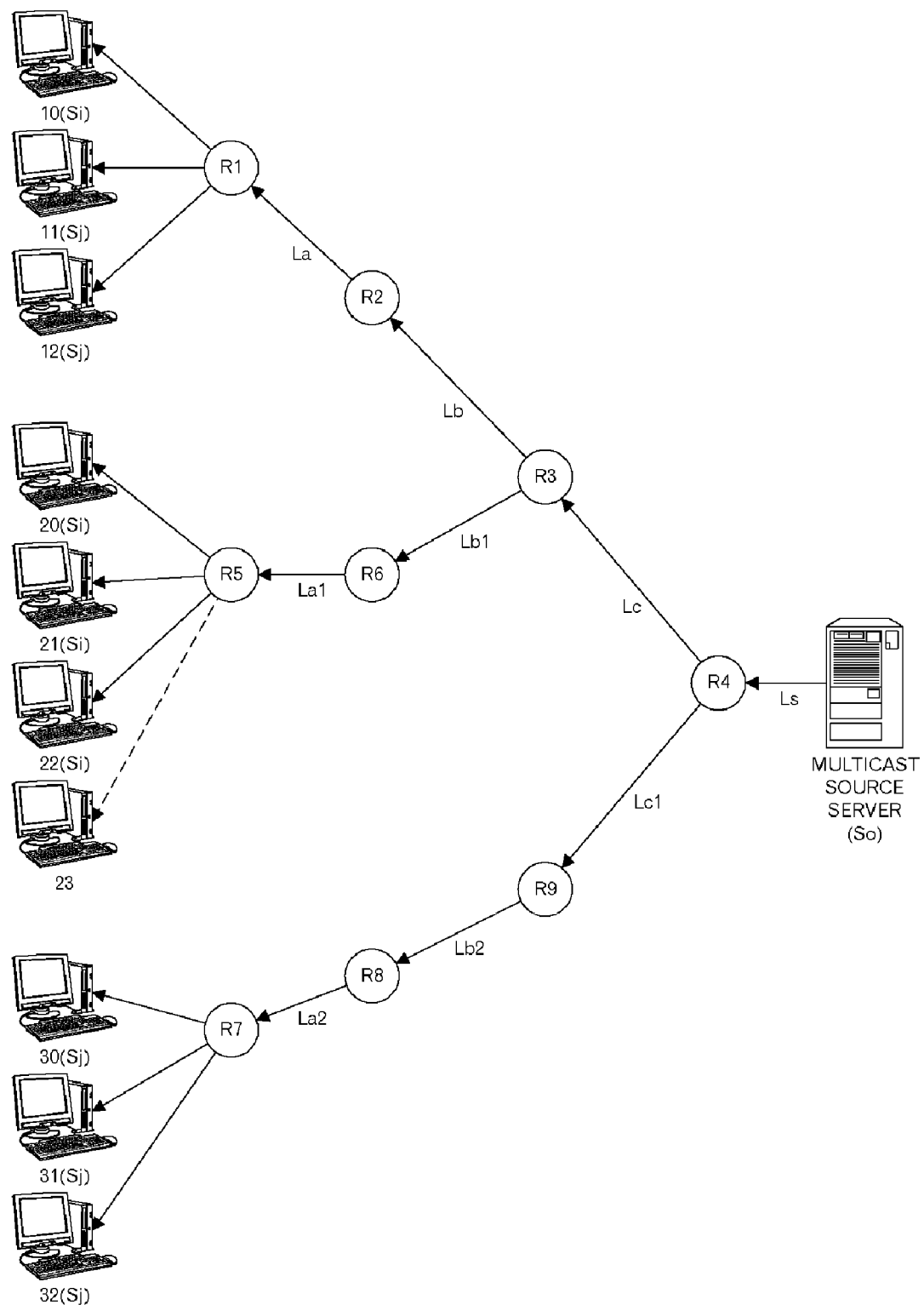
FIG. 10 is a diagram illustrating an example of a network in which the multicast is carried out.

More specifically, how to apply the RLP will be described below. Firstly, in order to have the explanation easily understood, for example, a specific state of a network, for example, as shown in FIG. 10 is assumed. In a specific example of FIG. 10, an edge router R1 is connected to client terminals having addresses 10 to 12, and is also connected to a router R2. The router R2 is also connected to a router R3. In addition, an edge router R5 is connected to client terminals having addresses 20 to 23, and is also connected to a router R6. The router R6 is also connected to the router R3. An edge router R7 is connected to client terminals having addresses 30 to 32, and is also connected to a router R8. The router R8 is also connected to a router R9. The router R9 is also connected to the edge router R4. The router R3 is connected to the edge router R4 in addition to the routers R2 and R6. Further, the edge router R4 is also connected to a multicast source server in addition to the routers R3 and R9.

In addition, a label La is assigned to a link between the edge router R1 and the router R2, and a label Lb is assigned to a link between the router R2 and the router R3. In addition, a label La1 is assigned to a link between the edge router R5 and the router R6, and a label Lb1 is assigned to a link between the router R6 and the router R3. Further, a label Lc is assigned to a link between the edge router R4 and the router R3, and a label La2 is assigned to a link between the edge router R7 and the router R8. A label Lb2 is assigned to a link between the router R8 and the router R9, and a label Lc1 is assigned to a link between the edge router R4 and the router R9. In addition, a label Ls is assigned to a link between the edge router R4 and the multicast source server.

In the state as shown in FIG. 10, for example, data shown in FIG. 11 is registered in the LP table of FIG. 9. Incidentally, FIG. 11 shows a simplified table of the LP table shown in FIG. 9. In an example of FIG. 11, the addresses 10 to 19 (the addresses 13 to 19 are not used) of the client terminals connected to the edge router R1, the addresses 20 to 29 (the addresses 24 to 29 are not used) of the client terminals connected to the edge router R5, and the addresses 30 to 39 (the addresses 33 to 39 are not used) of the client terminals connected to the edge router R7 are registered in a column of the source network address number (SNo). In addition, an address So of the multicast source server is registered in a column of the destination network address number (SNd). Further, the label La for the addresses 10 to 19 of the client terminals connected to the edge router R1, the label La1 for the addresses 20 to 29 of the client terminals connected to the edge router R5, and the label La2 for the addresses 30 to 39 of the client terminals connected to the edge router R7 are registered in a column of the virtual label Lr in RLP. Also, the labels La, Lb, and Lc of the links constituting LP between the multicast source server and the client terminals (addresses 10 to 19) connected to the edge router R1, the labels La1, Lb1, and Lc of the links constituting LP between the multicast source server and the client terminals (addresses 20 to 29) connected to the edge router R5, and the labels La2, Lb2, and Lc1 of the links constituting LP between the multicast source server and the client terminals (addresses 30 to 39) connected to the edge router R7 are registered in a column of the label data.

Furthermore, label maps 54 as shown in FIGS. 12A to 12I are stored in the routers R1 to R9, respectively. In this embodiment, such data are also stored in the LP-DB 31. FIG. 12A shows the label map 54 in the edge router R1. In FIG. 12A, from the left side of the table, the addresses 10 to 12 of the client terminals connected to the edge router R1 are registered in a column of a first label, a column of the virtual label remains blank, because there is no branch to any router at the edge router R1, and the label La of the link between the router R2 and the edge router R1 is registered in a column of a second label. In addition, FIG. 12B shows the label map 54 in the router R2. In FIG. 12B, from the left side of the table, the label La of the link between the edge router R1 and the router R2 is registered in the column of the first label, the column of the virtual label remains blank, because there is no branch to any router at the router R2, and the label Lb of the link between the router R2 and the router R3 is registered in the column of the second label. Further, FIG. 12C shows the label map 54 in the router R3. In FIG. 12C, the label map 54 has a first record including the label Lb of the link between the router R2 and the router R3 as the first label, the label La to branch off in the direction of the routers R1 and R2 as the virtual label, and the label Lc of the link between the edge router R4 and the router R3 as the second label, and a second record including the label Lb1 of the link between the router R6 and the router R3 as the first label, the label La1 to branch off in the direction of the routers R5 and R6 as the virtual label, and the label Lc of the link between the edge router R4 and the router R3 as the second label.

Moreover, FIG. 12D shows the label map 54 in the edge router R4. In FIG. 12D, the label map 54 has a first record including the label Lc of the link between the router R3 and the edge router R4 as the first label, the label La to branch off in the direction of the routers R1 and R2 and the label La1 to branch off in the direction of the routers R5 and R6 as the virtual labels, and the address So of the multicast source server as the second label, and a second record including the label Lc1 of the link between the router R9 and the edge router R4 as the first label, the label La2 to branch off in the direction of the routers R7 to R9 as the virtual label, and the address So of the multicast source server as the second label. Furthermore, FIG. 12E shows the label map 54 in the edge router R5. In FIG. 12E, from the left side of the table, the addresses 20 to 23 of the client terminals connected to the edge router R5 are registered in the column of the first label, the column of the virtual label remains blank, because there is no branch to any router at the edge router R5, and the label La1 of the link between the router R6 and the edge router R5 is registered in the column of the second label column. In addition, FIG. 12F shows the label map 54 in the router R6. In FIG. 12F, from the left side of the table, the label La1 of the link between the router R5 and the router R6 is registered in the column of the first label, the column of the virtual label remains blank, because there is no branch to any router at the router R6, and the label Lb1 of the link between the router R3 and the router R6 is registered in the column of the second column.

Furthermore, FIG. 12G shows the label map 54 in the edge router R7. In FIG. 12G, from the left side of the table, the addresses 30 to 32 of the client terminals connected to the edge router R7 are registered in the column of the first column, the column of the virtual label remains blank, because there is no branch to any router at the edge router R7, and the label La2 of the link between the router R8 and the edge router R7 is registered in the column of the second column. Furthermore, FIG. 12H shows the label map 54 in the edge router R8. In FIG. 12H, from the left side of the table, the label La2 of the link between the router R7 and the router R8 is registered in the column of the first label, the column of the virtual label remains blank, because there is no branch to any router at the router R8, and the label Lb2 of the link between the router R9 and the router R8 is registered in the column of the second column. In addition, FIG. 12I shows the label map 54 in the router R9. In FIG. 12I, from the left side of the table, the label Lb2 of the link between the router R8 and the router R9 is registered in the column of the first label, the column of the virtual label remains blank, because there is no branch to any router at the router R9, and the label Lc1 of the link between the edge router R4 and the router R9 is registered in the column of the second label.

Figure 13:
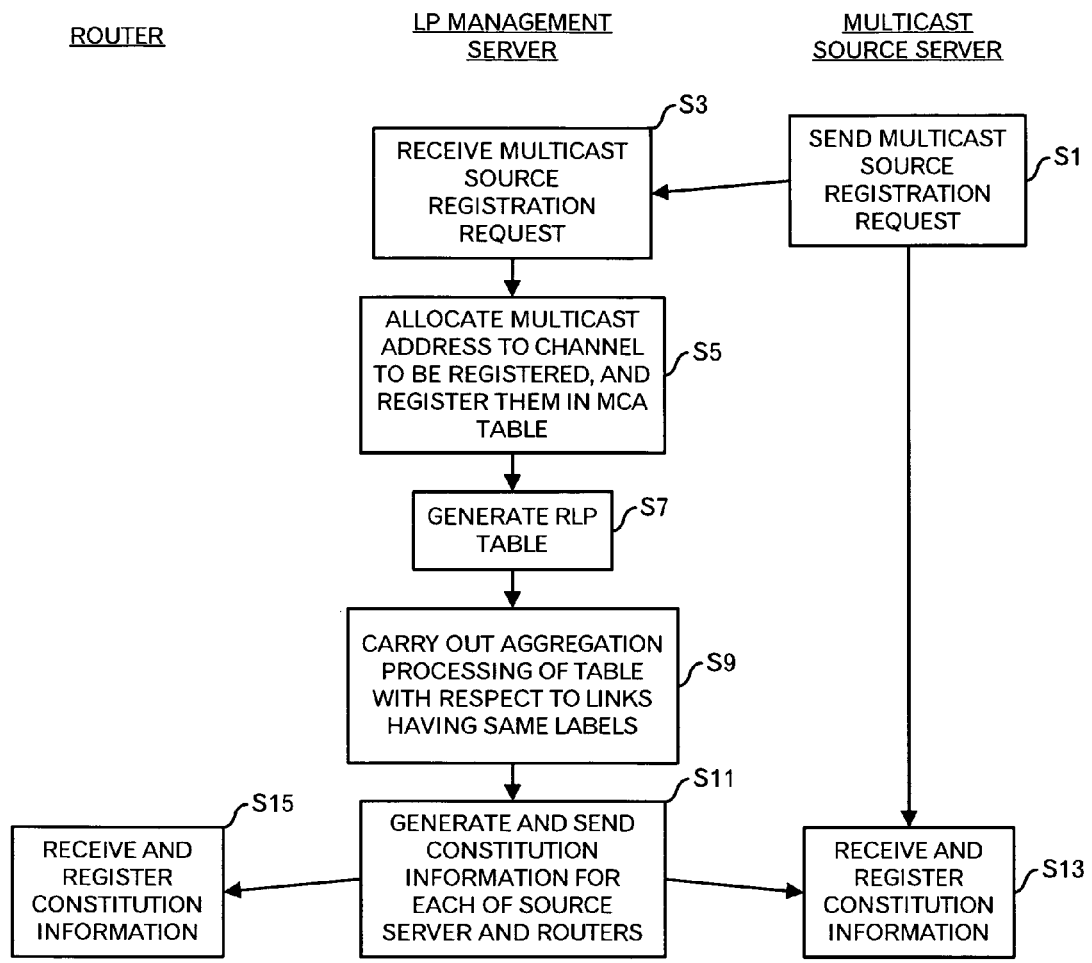
FIG. 13 is a diagram showing a processing flow of a multicast registration processing carried out by a multicast source server.

Under the aforementioned assumption, the LP management server 3, the multicast source server, and the routers carry out a processing shown in FIG. 13 to prepare the multicast. In order to register the start of the multicast, the multicast source server transmits a multicast source registration request including the source address So, data of a source channel (type and bandwidth to be used) and data of an area to be multicast, to the LP management server 3 (step S1). When receiving the multicast source registration request from the multicast source server (step S3), the LP management server 3 allocates a multicast address to each of the channels to be registered and registers the allocated multicast address in an MCA table (step S5). For example, the MCA table is as shown in FIG. 14. In an example of FIG. 14, the MCA table includes a column of a source address of the multicast source server, a column of a channel (CH), and a column of a multicast address (MCA). This table makes it possible to identify the multicast addresses by a combination of the source address and the registered channel.

Moreover, the LP management server 3 generates an RLP table (step S7). More specifically, the client terminals in the area to be multicast, which is included in the multicast source registration request, are identified by using the data stored in the LP-DB 31 shown in FIG. 11 and FIGS. 12A to 12I, and the LPs associated with the edge router connected to the identified client terminal and labels constituting the LPs are further identified. In an example of FIG. 11 and FIGS. 12A to 12I, it is assumed that all the addresses 10 to 12, 20 to 23, and 30 to 32 of the client terminals are arranged in the area to be multicast. Then, an LP whose name is L10 and which is composed of links whose label names are La, Lb, and Lc, an LP whose name is L20 and which is composed of links whose label names are La1, Lb1, and Lc, and an LP whose name is L30 and which is composed of links whose label names are La2, Lb2, and Lc1 are identified. More specifically, in the tables shown in FIGS. 12A to 12I, the LPs may be identified from the addresses of the client terminals in the area to be multicast, and the labels may be identified by tracing the labels up to the address So of the multicast source server. Incidentally, plural LPs may be identified for each combination of SNo and SNd. In this embodiment, one LP suitable for the data distribution is selected on the basis of, for example, the allocation state of the existing multicast and a dynamic transmission bandwidth.

The LPs are identified in this way to generate a table shown in FIG. 15. The table shown in FIG. 15 includes a column of an LP name, a column of a client terminal address (CL), a column of a requesting source of the client terminal, a column of a first label (L), a column of a multicast index (Mi) of the first label (L), a column of a second label (L), a column of a multicast index (Mi) of the second label (L), a column of a third label (L), a column of a multicast index (Mi) of the third label (L), and a column of a source address (Ls) of the multicast source server. When the tables as shown in FIGS. 12A to 12I are used as the base, the column of the virtual label is substituted with the column of the multicast index (Mi).

Then, the LP management server 3 scans the labels in the direction from the source address of the multicast source server to the lower-level label, that is, in the direction of the data transmission, and carries out an aggregation processing of the table with respect to the links having the same label (step S9). In an example of FIG. 15, the source address So in the column of Ls is aggregated, because it is common to all the LPs, and the next lower label Lc is aggregated, because it is common to the links whose label names are La and La1. FIG. 16 shows an RLP table after such an aggregation. FIG. 16 shows a branching manner from the source address So, from the right to the left. That is, an original form of a multicast tree is formed from the multicast source address So to the address CL of the client terminal.

In addition, the LP management server 3 generates constitution information for each of the multicast source server and the routers and transmits the constitution information to the multicast server and the routers (step S11). The constitution information transmitted to the multicast source server includes the multicast addresses allocated to the respective registered channels. In addition, in this embodiment, the multicast label Ls is allocated to the link from the multicast source server to the edge router R4, and the multicast label Ls is also included in the constitution information. Furthermore, data as shown in FIGS. 17A to 17I is transmitted to the routers as the constitution information. The data shown in FIGS. 17A to 17I are obtained by modifying the data of the label maps 54 shown in FIGS. 12A to 12I, and the tables shown in FIGS. 17A and 17I have a data structure in which the multicast index Mi is registered instead of the virtual label.

When receiving the constitution information from the LP management server 3, the multicast source server stores the received constitution information in a storage device (step S13). In addition, when receiving the constitution information from the LP management server 3, each router stores the constitution information in a storage device thereof as data for routing the multicast packets (step S15).

By carrying out the aforementioned processing, a pre-processing for the multicast transmission is completed, and the connection and disconnection is effectively managed. Accordingly, it is possible to easily carry out the connection and disconnection.

Next, a processing when the client terminal (address 23) transmits a new multicast connection request will be described. Incidentally, in order to have this embodiment easily understood, as shown in FIG. 10, the following configuration is assumed: the client terminal (address 10) is connected to a multicast address Si; the client terminal (address 11) is connected to a multicast address Sj; the client terminal (address 12) is connected to the multicast address Sj; the client terminals (addresses 20 to 22) are connected to the multicast address Si; and the client terminals (addresses 30 to 32) are connected to the multicast address Sj.

Then, the RLP table is assumed to be a state shown in FIG. 18. That is, the requesting source is represented by a combination of the source address So of the connected multicast source server and the connected multicast address Si or Sj. "So.Si" is registered with respect to the client terminals (addresses 10 and 20 to 22), and "So.Sj" is registered with respect to the client terminals (addresses 11 and 12, and 30 to 32). Then, Si and Sj are registered in the column of the multicast index Mi for the label La associated with the client terminals connected to the multicast addresses Si and Sj. Also, with respect to the column of the multicast index Mi for the labels Lb and Lc, the same registration is carried out. Furthermore, Si is registered in the column of the multicast index Mi for the label La1 associated with the client terminals connected to the multicast address Si. Also, with respect to the column of the multicast index column Mi for the label Lb1, the same registration is carried out. Moreover, Sj is registered in the column of the multicast index Mi for the label La2 associated with the client terminals connected to the multicast address Sj. Also, with respect to the column of the multicast index Mi for the labels Lb2 and Lc1, the same registration is carried out.

Furthermore, data shown in FIGS. 19A to 19I are set to the respective routers. With respect to the multicast index Mi, the same as described above is registered.

Incidentally, an example of the routing of the multicast packet will be described here. First, when the multicast source server transmits a packet including the multicast label Ls and the multicast address Si in a header thereof, the edge router R4 acquires the label Lc, on the basis of the data shown in FIG.

19D, to route the received packet to the corresponding link. Here, the packet is transmitted to the router R3. At that time, the multicast label Ls is replaced with the label Lc in the header of the packet. When receiving a packet including the label Lc and the multicast address Si in a header thereof, the router R3 acquires the label Lb, on the basis of the data shown in FIG. 19C, to route the received packet to the corresponding link. Here, the packet is transmitted to the router R2. At that time, the label Lc is replaced with the label Lb in the header of the packet. When receiving a packet including the label Lb and the multicast address Si in a header thereof, the router R2 acquires the label La, on the basis of the data shown in FIG. 19B, to route the received packet to the corresponding link. Here, the packet is transmitted to the edge router R1. At that time, the label Lb is replaced with the label La in the header of the packet. When receiving a packet including the label La and the multicast address Si in a header thereof, the edge router R1 acquires the address 10, on the basis of the data shown in FIG. 19A, to route the received packet to the client terminal (address 10).

Figure 20:
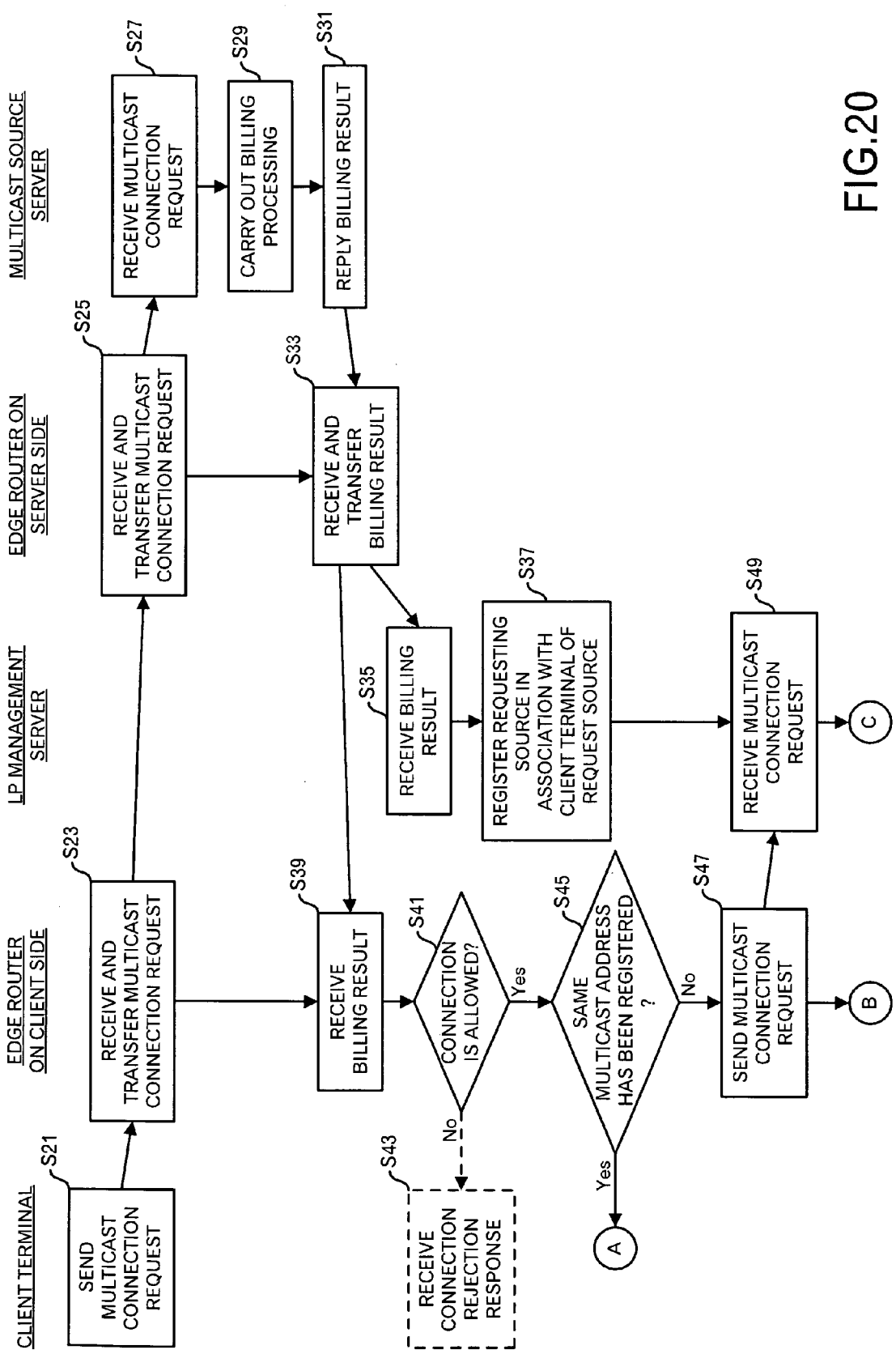
FIG. 20 is a diagram showing a processing flow for an additional connection.

Then, a processing when the client terminal (address 23) is connected to the multicast address Sj will be described with reference to FIG. 20. First, the client terminal (address 23) transmits a multicast connection request including billing information (including an ID and a password and the like), its own address, the multicast address Sj and the like to the multicast source server (step S21). This request is transmitted in response to, for example, an instruction of a user of the client terminal. When receiving the multicast connection request including the billing information, a source address, the multicast address Sj and the like from the client terminal (address 23), the edge router R5 on the client terminal side transfers the received request to the multicast source server (step S23). Incidentally, because the routing at that time is the same as that of a normal MPLS, the description thereof will be omitted. In addition, data concerning the multicast connection request is stored in the storage device. As the result of the routing, the edge router R4 on the server side receives the multicast connection request including the bill information, the source address, the multicast address Sj and the like from the client terminal (address 23), and transfers the multicast connection request to the multicast source server (step S25).

The multicast source server receives the multicast connection request from the client terminal (address 23) (step S27). In this way, the multicast source server carries out a billing processing by using the billing information included in the multicast connection request (step S29). For example, it carries out an authentication processing by using the user's ID and password, and the billing processing, such as recording of the connection time, when the authentication succeeds. Then, the multicast source server replies a billing result including data concerning whether or not the connection is allowed, the address of the client terminal, the multicast address and the like (step S31). When receiving the billing result from the multicast source server, the edge router R4 on the server side transfers the billing result to the edge router on the client terminal side according to RLP (step S33). At that time, the multicast source server also transmits the billing result to the LP management server 3.

When receiving the billing result from the edge router R4 on the server side (step S35), the LP management server 3 registers the requesting source (So.Sj: the source address So of the multicast source server. the multicast address Sj) corresponding to the client terminal (address 23) of the connection request source in the RLP table shown in FIG. 18, using data included in the billing result (step S37). Incidentally, in this embodiment, the requesting source is registered using the data included in the billing result. However, for example, the multicast address Sj, the source address So of the multicast source server, the address of the client terminal and the like may be received from the edge router on the client terminal side to execute the step S37.

When receiving the billing result from the edge router R4 on the server side (step S39), the edge router R5 on the client terminal side determines whether or not the connection is allowed, on the basis of the billing result (step S41). When it is determined that connection is not allowed, the edge router 5 transmits a connection rejection response (or the billing result itself) to the client terminal of the connection request source. The client terminal of the connection request source receives the connection rejection response (or the billing result itself) from the edge router R5 on the client terminal side, and then displays it on a display device (step S43).

Meanwhile, when receiving the billing result indicating that connection is allowed, the edge router R5 determines whether or not the same multicast address has already been registered (step S45). When the same multicast address has already been registered, the client terminal of the connection request source can be connected to the requesting multicast address Sj by only a processing in the edge router R5. Therefore, the processing proceeds to step S57 in FIG. 21 through a terminal A. In this specific example, referring to the table shown in FIG. 19E, because Sj is not registered in the column of Mi in any records, the processing proceeds to step S47.

In the step S47, the edge router R5 on the client terminal side generates a multicast connection request from the edge router R5 by using the data of the multicast connection request, which has been received and stored in the step S23, and transmits the generated request to the LP management server 3 (step S47). The multicast connection request includes the address of the client terminal of the connection request source, the address So of the multicast source server, and the multicast address Sj. The billing information is removed, because it is not necessary. The LP management server 3 receives the multicast connection request from the client terminal (step S49). Then, the processing shifts to a processing shown in FIG. 21 through terminals A to C.

Figure 21:
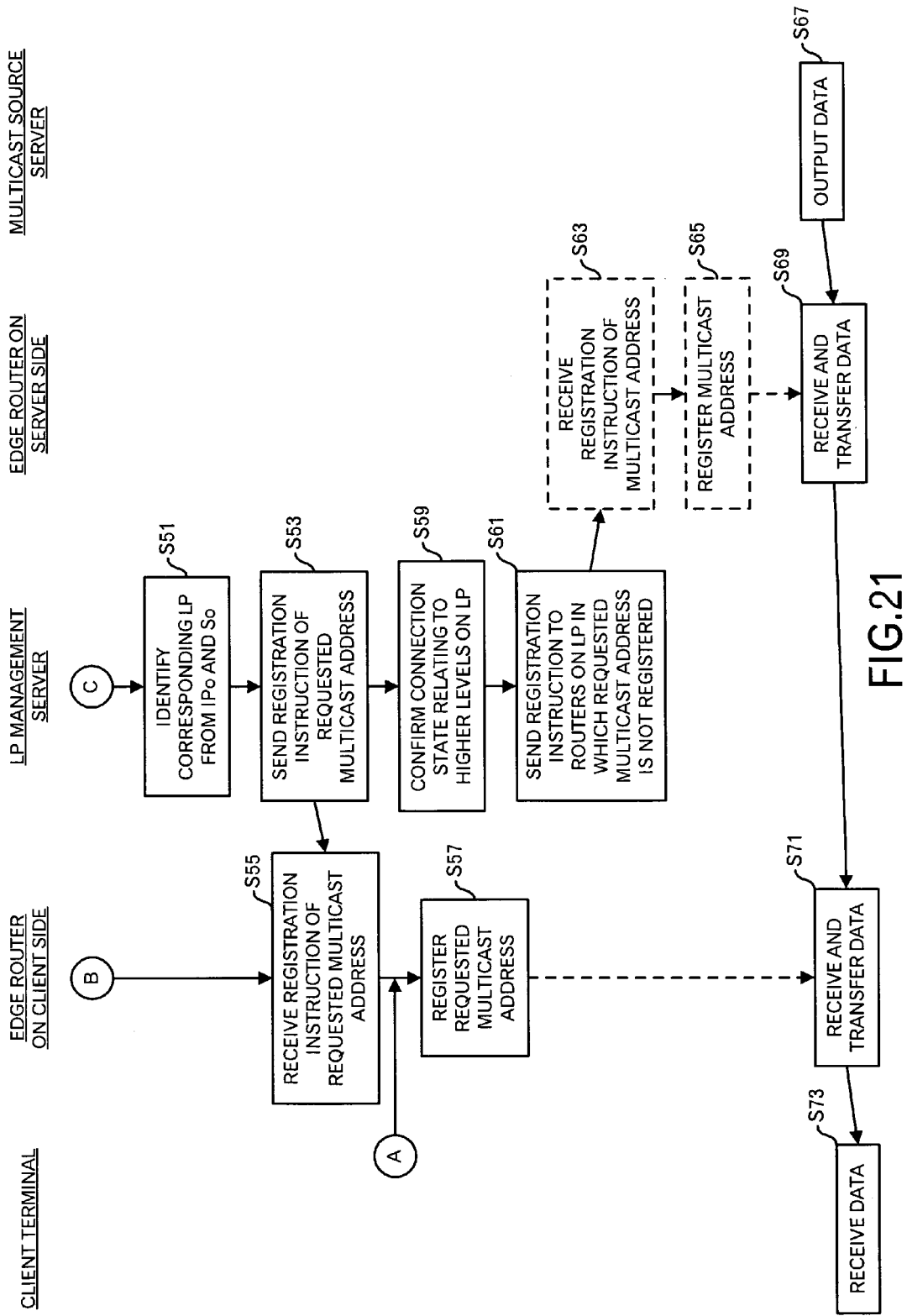
FIG. 21 is a diagram showing a processing flow for the additional connection.

In FIG. 21, the LP management server 3 searches the RLP table (FIG. 18) by a combination of the address (IPo=23) of the client terminal of the connection request source and the source address So of the multicast source server, to identify the corresponding LP (step S51). Then, the LP management server 3 transmits a registration instruction of the multicast address Sj to the edge router R5 that transmitted the multicast connection request at the beginning (step S53). This registration instruction includes the address (IPo=23) of the client terminal of the connection request source, the lowest label La1 in the identified LP, and the multicast address Sj. The edge router R5 on the client terminal side receives the registration instruction of the multicast address Sj from the LP management server 3 (step S55), and registers the multicast address Sj by using data included in the registration instruction (step S57). That is, the multicast address Sj is registered in association with the label La1 and the address 23 of the client terminal of the connection request source, so that a change from FIG. 19E to FIG. 22A is made.

Further, the LP management server 3 confirms the connection state with respect to higher levels on the identified LP in the RLP table (step S59). In the example of FIG. 18, it is confirmed that the multicast address Sj is not registered in association with the labels La1 to Lc (more specifically, La1, Lb1, and Lc). Therefore, the LP management server 3 identifies routers in which the requested multicast address Sj is not registered, on the LP, except for the edge router R5, and transmits a registration instruction to the identified routers (step S61). In the example of FIG. 18, because the label La1 and the label Lb1 are identified, it identifies the router R6 associated with the label La1 from, for example, FIG. 19F, and transmits the registration instruction including the labels La1 and Lb1 and the multicast address Sj to the router R6. In addition, it registers the multicast address Sj in the column of the multicast index Mi, which is associated with the label La1, in the RLP table shown in FIG. 18. When receiving the registration instruction, the router R6 registers the multicast address Sj in the corresponding record. The table shown in FIG. 19F is changed to the table shown in FIG. 22B.

Furthermore, the LP management server 3 identifies the router R3 associated with the label Lb1, and transmits the registration instruction including the labels Lb1 and Lc and the multicast address Sj to the router R3. In the RLP table shown in FIG. 18, the multicast address Sj is also registered in the column of the multicast index Mi, which is associated with the label Lb1. In addition, when receiving the registration instruction, the router R3 registers the multicast address Sj in the corresponding record. The table shown in FIG. 19C is changed to the table shown in FIG. 22C.

If necessary, the LP management server 3 also transmits the registration instruction to the edge router R4. When receiving the registration instruction (step S63), the edge router R4 also registers the multicast address (step S65). However, because the multicast address is not registered in the example of FIG. 18, the steps 63 and 65 are indicated by blocks with dotted lines.

When the processing is carried out up to this stage, the table shown in FIG. 18 is changed to a table shown in FIG. 23. In FIG. 23, modified portions are hatched. In addition, when the multicast source server transmits multicast packets relating to the multicast address Sj (step S67), the client terminal of the connection request source can receive data of the multicast packets through the edge router R4 on the server side and the edge router R5 on the client terminal side (steps 69, 71, and 73).

Incidentally, when the multicast source server transmits the multicast packet including the multicast label Ls and the multicast address Sj, the packet is transferred to the client terminal (address 23) according to the first record of the table shown in FIG. 19D for the edge router R4, the second record of the table shown in FIG. 22C for the router R3, the first record of the table shown in FIG. 22B for the router R6, and the fourth record of the table shown in FIG. 22A for the edge router R5.

Such an additional connection can be carried out by a relatively simple processing. Incidentally, a portion relating to the billing processing can be omitted. However, instead of the billing result, a connection request should be transmitted to the LP management server 3.

Figure 24:
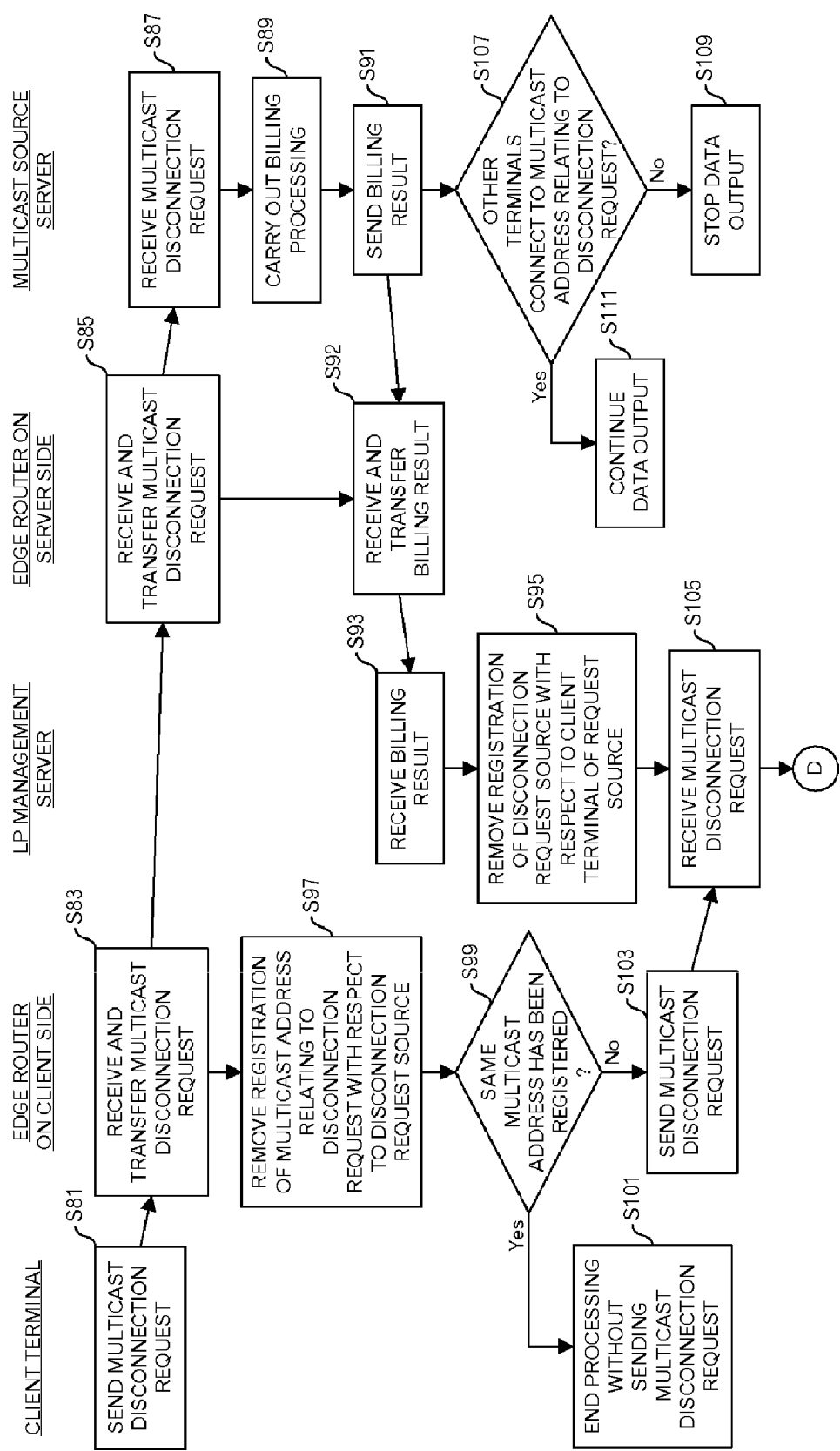
FIG. 24 is a diagram showing a processing flow of a disconnection processing.
Figure 25:
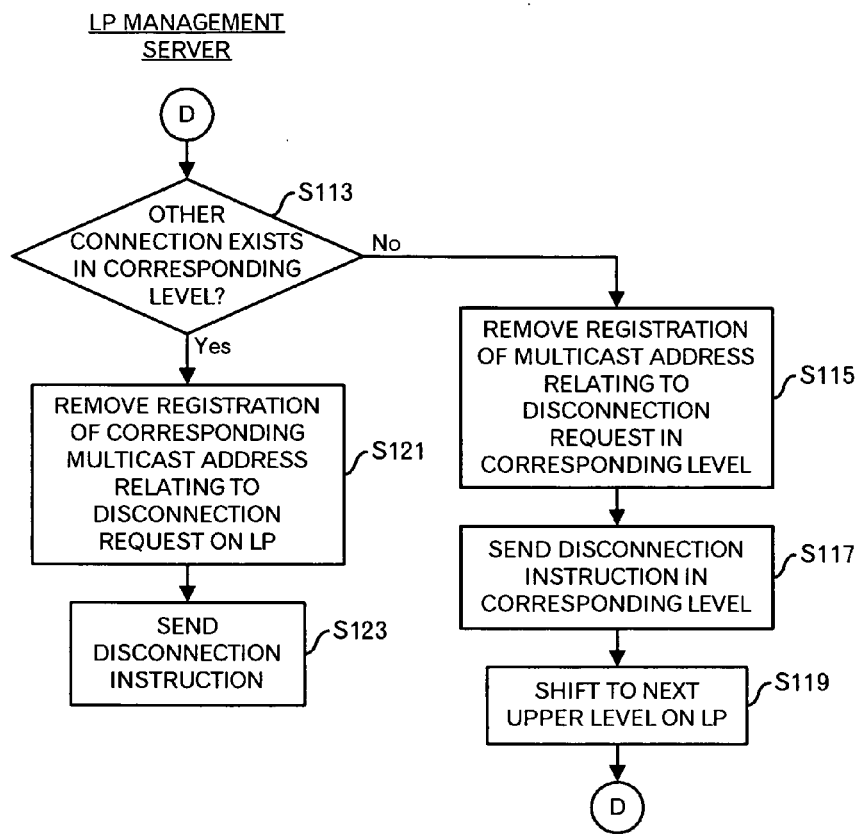
FIG. 25 is a diagram showing a processing flow of the disconnection processing.

Next, a processing flow of a disconnection processing will be described with reference to FIGS. 24 and 25. Specifically, a case in which the client terminal (address 23) disconnects the connection relating to the multicast address Sj will be described. First, the client terminal (address 23) transmits a multicast disconnection request including the billing information (for example, ID), the multicast address Sj relating to the disconnection, its own address and the like to the multicast source server (step S81). When receiving the multicast disconnection request including the billing information, the multicast address Sj, the source address and the like from the client terminal, the edge router R5 on the client terminal side transfers it to the multicast source server (step S83). Incidentally, because the routing at that time is the same as that of a normal MPLS, the description thereof will be omitted. In addition, data of the multicast disconnection request is stored in the storage device. As the result of the routing, the edge router R4 on the server side receives the multicast disconnection request including the bill information, the source address, the multicast address Sj and the like from the client terminal (address 23), and transfers it to the multicast source server (step S85).

The multicast source server receives the multicast disconnection request from the client terminal (address 23) (step S87). Then, the multicast source server carries out a billing processing by using the billing information included in the multicast connection request (step S89). For example, the billing processing, such as recording of disconnection time and ID, is carried out. Then, the multicast source server replies a billing result for the completion of the disconnection, which includes the address of the client terminal, the multicast address and the like (step S91). When receiving the billing result for the completion of the disconnection from the multicast source server, the edge router R4 on the server side transmits it toward the edge router on the client terminal side according to the LP (step S92). At that time, the multicast source server also transmits the billing result for the completion of the disconnection to the LP management server 3. Incidentally, although not shown in FIG. 24, the edge router R5 on the client terminal side receives the billing result for the completion of the disconnection, and transfers it to the client terminal.

On the other hand, when receiving the billing results for the completion of the disconnection from the edge router R4 on the server side (step S93), the LP management server 3 removes the registration of the disconnection request source with respect to the client terminal of the disconnection request source in the RLP table shown in FIG. 23 (step S95). Incidentally, in this embodiment, the registration of the disconnection request source is removed by using the data included in the billing result for the completion of the disconnection. However, for example, the multicast address Sj, the source address So of the multicast source server, the address of the client terminal and the like may be received from, for example, the edge router on the client terminal side to execute the step S95.

Meanwhile, the edge router R5 on the client terminal side removes the registration of the multicast address Sj relating to the disconnection request with respect to the client terminal (address 23) of the disconnection request source, on the basis of the multicast disconnection request (step S97). More specifically, the multicast address Sj is removed from the column of the multicast index Mi in the fourth record shown in FIG. 22A. Moreover, the edge router R5 determines whether or not the same multicast address Sj (requesting source So.Sj) is registered with respect to other client terminals on the same LP, by referring to the RLP table shown in FIG. 23 or the like (step S99). Specifically, it determines whether or not any one of the client terminals connected to the edge router R5 on the client terminal side is connected to the multicast address Sj relating to the disconnection request. When the multicast address Sj (request source So.Sj) relating to the disconnection request is registered with respect to any client terminal, without transmitting the multicast disconnection request to the LP management server 3, the processing is terminated (step S101).

On the other hand, when the multicast address Sj (requesting source So.Sj) relating to the disconnection request is not registered with respect to any client terminal, the edge router R5 on the client terminal side generates the multicast disconnection request including the address of the client terminal of the disconnection request source, the source address So of the multicast source server, the multicast address Sj and the like, by using the data of the multicast disconnection request which has been received and stored in the step S83, and transmits it to the LP management server 3 (step S103). The LP management server 3 receives the multicast disconnection request (step S105). Then, the processing shifts to a processing shown in FIG. 25 through a terminal D.

Incidentally, the multicast source server determines whether or not other client terminals are connected with the multicast address Sj relating to the disconnection request (step S107). Then, when other client terminals receive data from the multicast address Sj, it has the data output continued (step S11). On the other hand, when any other terminals do not receive data from the multicast address Sj, it has the data output stopped (step S109). Accordingly, it becomes possible to effectively use a transmission bandwidth. However, the steps S107 to S109 may not be necessarily carried out.

The LP management server 3 identifies the corresponding LP from the source address So of the multicast source server, the address of the client terminal of the disconnection request source and the like, which are included in the multicast disconnection request. Then, the LP management server 3 determines whether or not other client terminals are connected to the same multicast address Sj, that is, the same requesting source (So.Sj) is registered with respect to other client terminals, in the corresponding level on the identified LP from the RLP table shown in FIG. 23 or the like (step S113). In this embodiment, a level handling method differs from that in the case of the connection. This is because the edge router R5 carried out the disconnection processing in advance (the level of the label La1 has already been processed), an idea of connecting data flows to the upstream side in the case of the connection is employed, but an idea of cutting off the flow of data to the downstream side is employed in the case of the disconnection. Therefore, in this example, the first corresponding level is the level of the label Lb1, and the multicast index Mi for the label Lb1 is a multicast index adjacent to the left side of the label Lb1. Then, it determines whether or not the same requesting source (So.Sj) is registered in association with the client terminals (addresses 20 to 22) associated with the label Lb1. Then, because every terminal is connected to the multicast address Si and the requesting source is So.Si, it is determined that the same requesting source (So.Sj) is not registered. Thus, the LP management server removes the multicast address Sj relating to the disconnection request from the column of the multicast index Mi in the corresponding level (step S115).

Further, the LP management server 3 generates a disconnection request in the corresponding level, including the label Lb1 in the corresponding level, the label La1, which is a label on the downstream side, constituting a pair together with the label Lb1, and the multicast address Sj, and transmits the disconnection request to the router in the corresponding level (step S117). The router in the corresponding level is the router R6, and it can be identified from a table having a record in which a pair of labels La1 and Lb1 is registered, based on data shown in, for example, FIG. 19 or 22. Then, the processing proceeds to a processing for the next upper-level label on the identified LP (step S119) to return to the step S113. Here, the processing shifts to a processing for the label Lc.

Because the corresponding level shifts to the level of the label Lc, the LP management server determines whether or not other client terminals are connected to the same multicast address Sj in the corresponding level (step S113). The client terminals associated with the label Lc includes the client terminals having the addresses 10 to 12 in addition to the client terminals having the addresses 20 to 22. Because the client terminals having the addresses 11 and 12 are connected to the multicast address Sj, it removes only the multicast address Sj in a multicast index Mi in the identified RLP from among two multicast indexes Mi associated with the label Lc at this time (step S121). Then, the LP management server 3 generates a disconnection request including the label Lc in the corresponding level, the label Lb1, which is a label on the downstream side, constituting a pair with the label Lc, and the multicast address Sj, and transmits the disconnection request to the router in the corresponding level (step S123). The router in the corresponding level is the router R3, and it can be identified from a table having a record in which a pair of labels La1 and Lb1 is registered, based on data shown in, for example, FIG. 19 or 22.

When the aforementioned processing is carried out, the RLP table and data in each router returns to the states shown in FIGS. 18 and 19. Thus, in this embodiment, it is possible to carry out the disconnection by a relatively simple processing. Incidentally, a portion relating to the billing processing may not be carried out. However, instead of the billing result, a notice should be given from the edge router R5 on the client terminal side to the LP management server 3.

Although the embodiment of the invention is described above, the invention is not limited thereto. For example, other processings may be carried out to obtain the same result by using the same data structure, or different data structures may be used to obtain the same result.

Further, the functional block diagram of the router shown in FIG. 4 is just an illustrative example, and thus the functional blocks do not necessarily correspond to the actual elements, respectively.

In the initial constitution of the multicast tree in the LP management server, data of the multicast address indicating a subscription state is previously registered in the column of Mi, and such data is also distributed to the routers as data for Mi. Accordingly, the routers can carry out control of the registration and removal of the registration (connection and disconnection). As shown in FIG. 27, with respect to the column of Mi, the column of the multicast is defined, and in the column of the multicast, the multicast address (Si, Sj) that are required to register the subscription are prepared. Values indicating a "subscription/connection" state (which is represented by a symbol "○" in FIG. 27), a "subscription/disconnection" state (which is represented by a symbol "Δ" in FIG. 27), and a "non-subscription state" (which is represented by a symbol "–" in FIG. 27) are entered in the columns. In the initial constitution of the multicast tree, in the LP management server, the "subscription/disconnection" state (which is represented by a symbol "Δ" in FIG. 27) or the "non-subscription state" (which is represented by a symbol "–" in FIG. 27) is set in each Mi.Sj column, and data structures shown in FIGS. 28A to 28*i* are distributed to the corresponding routers, respectively. In this way, it is possible to control connection and disconnection states according to the multicast tree by only routers. In this case, the LP management server has only to manage the multicast tree and subscription/non-subscription. Accordingly, it becomes possible to reduce a controlling load.

Figure 26:
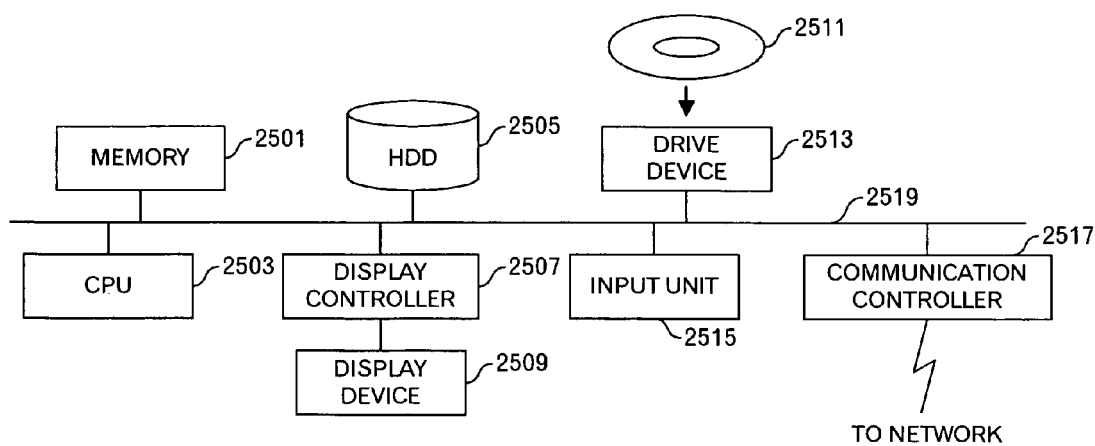
FIG. 26 is a functional block diagram of a computer system.

In addition, the LP management server 3 is a computer device as shown in FIG. 26. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 26. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Although the present invention has been described with respect to a specific preferred embodiment thereof, various change and modifications may be suggested to one skilled in the art, and it is intended that the present invention encompasses such changes and modifications as fall within the scope of the appended claims.

What is claimed is:

1. An information processing method, comprising:
    managing, with a management server, paths in a specific network;
    receiving, at said management server, a registration request including data concerning a source address and a source channel from a multicast source server;
    allocating, at said management server, a multicast address corresponding to said source channel to discriminate passing multicast data;
    storing said multicast address into a multicast data storage in association with said source channel;
    reading out, with said management server, from a path data storage that stores data concerning labels of links constituting paths in said specific network, data concerning labels of links constituting a multicast path from said source address included in said registration request to an edge router connected to a computer which is operable to receive multicast data;
    generating, at said management server, a data structure capable of registering said multicast address in association with each said label;
    changing, with said management server, said data structure into a form in which a portion having a common label is aggregated with respect to a plurality of multicast paths from said source address included in said registration request; and
    carrying out, at said management server, a setting for a router on said multicast path by using said data structure stored in said multicast data storage so as to allow said router to carry out routing by a set of said label and said multicast address.

2. A computer-readable storage medium storing a program for causing a management server to execute an information processing, comprising:
    managing, with said management server, paths in a specific network;
    receiving, at said management server, a registration request including data concerning a source address and a source channel from a multicast source server;
    allocating, at said management server, a multicast address corresponding to said source channel to discriminate passing multicast data;
    storing said multicast address into a multicast data storage in association with source channel;
    reading out, with said management server, from a path data storage that stores data concerning labels of links constituting paths in said specific network, data concerning labels of links constituting a multicast path from said source address included in said registration request to an edge router connected to a computer, which is operable to receive multicast data;
    generating, at said management server, a data structure capable of registering said multicast address in association with each said label;
    changing, with said management server, said data structure into a form in which a portion having a common label is aggregated with respect to a plurality of multicast paths from said source address included in said registration request; and
    carrying out, at said management server, a setting for a router on said multicast bath by using said data structure stored in said multicast data storage so as to allow said router to carry out routing by a set of said label and said multicast address.

3. A management server for managing paths in a specific network, comprising:
    a multicast data storage;
    a path data storage that stores data concerning labels of links constituting paths in said specific network; and
    a processor programmed to carry out a process comprising:
        allocating, upon receiving a registration request including data concerning a source address and a source channel from a multicast source server, a multicast address corresponding to said source channel to discriminate passing multicast data;
        storing said multicast address into said multicast data storage in association with said source channel;
        reading out, from said path data storage, data concerning labels of links constituting a multicast path from said source address included in said registration request to an edge router connected to a computer, which is operable to receive multicast data;
        generates a data structure capable of registering said multicast address in association with each said label;
        changing said data structure into a form in which a portion having a common label is aggregated with respect to a plurality of multicast paths from said source address included in said registration request; and
        carrying out a setting for a router on said multicast path by using said data structure stored in said multicast data storage so as to allow said router to carry out routing by a set of said label and said multicast address.

* * * * *